Sept. 15, 1936.  N. W. CUMMINS  2,054,245
METHOD OF MAKING A CUP
Filed July 14, 1932  2 Sheets-Sheet 1

Inventor
NORMAN W. CUMMINS
By John L. Milton
Attorney.

Sept. 15, 1936.    N. W. CUMMINS    2,054,245
METHOD OF MAKING A CUP
Filed July 14, 1932    2 Sheets-Sheet 2

Inventor
NORMAN W. CUMMINS
By John L. Milton
Attorney

Patented Sept. 15, 1936

2,054,245

UNITED STATES PATENT OFFICE 2,054,245

METHOD OF MAKING A CUP

Norman W. Cummins, Louisville, Ky.

Application July 14, 1932, Serial No. 622,374

9 Claims. (Cl. 29—148.2)

This invention pertains to a structure and method of producing hollow ware to be mounted on a base to produce cups such as used for serving liquids, ices and other comestibles.

The object of this invention is to organize a method for producing a type of cup that lends itself to mass production.

To enable a full understanding of this invention reference is had to the accompanying drawings which are incorporated into this specification.

Numeral 10 is a bowl which is drawn in a conventional way plus a forming to produce a reverse curve 10a adjacent the opening.

Numeral 11 indicates a detachable base molded from phenol-aldehyde, condensation product or the like which is shown removably attached to the outside bottom of said bolt by means of screw 12 and nut 13.

Heretofore it has been common practice to make cups of this class of two pieces and permanently attaching them together by riveting, soldering, brazing, et cetera. A feature of the cup produced by the incident method is the provision of means for attaching a screw to the outside bottom of the bowl in such a manner as not to break or mar the inside surface which would be incident to other attaching methods. This screw is employed for the attachment of a base, which can be of any selected material or finish.

Figure 4:
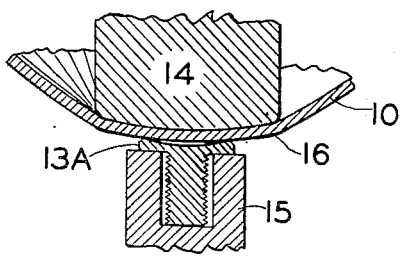
Fig. 4 is a modification of Fig. 3 together with a portion of the tools for effecting attachment of the screw to the bowl.

The screw has been fashioned as shown by the numerals 13—13a with a major portion of the top of head removed to enable instant attachment by electrically welding as shown in Fig. 4, wherein 14 indicates relatively large electrode, the face of which is fashioned to exactly correspond with the inside surface of the bowl to present a large area and to prevent distortion when the electric current is applied between same and electrode 15 which is hollowed out to receive screw 13. The top face of 13a has been made concave on a lesser arc than the outside convex surface 16 of bowl 10.

It will be perceived that as current is applied to the electrodes with the contacting surfaces being very small that a rapidly formed weld results. Attention is also directed to the fact that the head of screw 13a has a thickness substantially the same as that of the wall of bowl 10 which also makes for a rapid and non-disturbing action.

Figure 3:
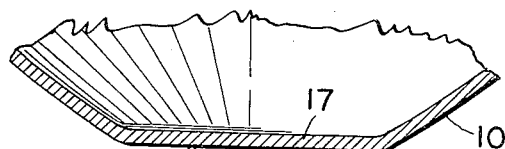
Fig. 3 is a cross section of the bowl as shown in Fig. 1 together with a cross sectional elevation of the screw prior to attachment of the outside base of the bowl.

In Fig. 3 the same general idea has been carried out to correspondingly effect a welding where flat bottom 17 has been formed in bowl 10. While it is possible to effect a weld between the outside bottom of bowl and top surface of the screw where the abutting surfaces are both practically flat, the preferred method has been shown. The bowl shown in Fig. 5 while of a different shape belongs to the same general class and can have screws attached as shown in the preceding figures and for the same purpose, it will be perceived that the bases for both types of cups are interchangeable.

Figure 1:
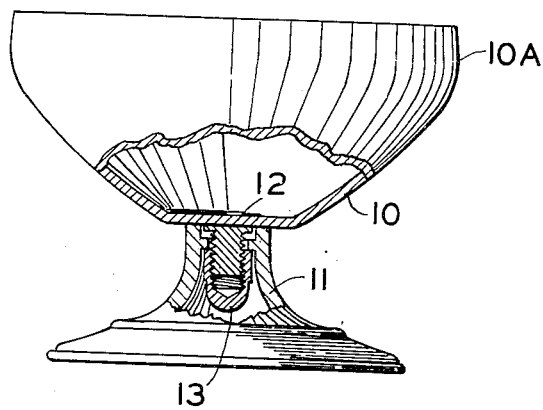
Figure 1 is an elevational view of a bowl and base constituting a cup, shown partially in cross section.
Figure 2:
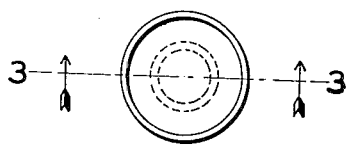
Fig. 2 is a top view of the screw shown in Fig. 3 for securing the bowl to the base.

Bases made of metal or other types of material can be substituted for the one shown in Fig. 1. This system has been evolved to meet a growing demand for a variety of colored bases with bright or colored finished bowls such as chromium.

Figures 5, 6:
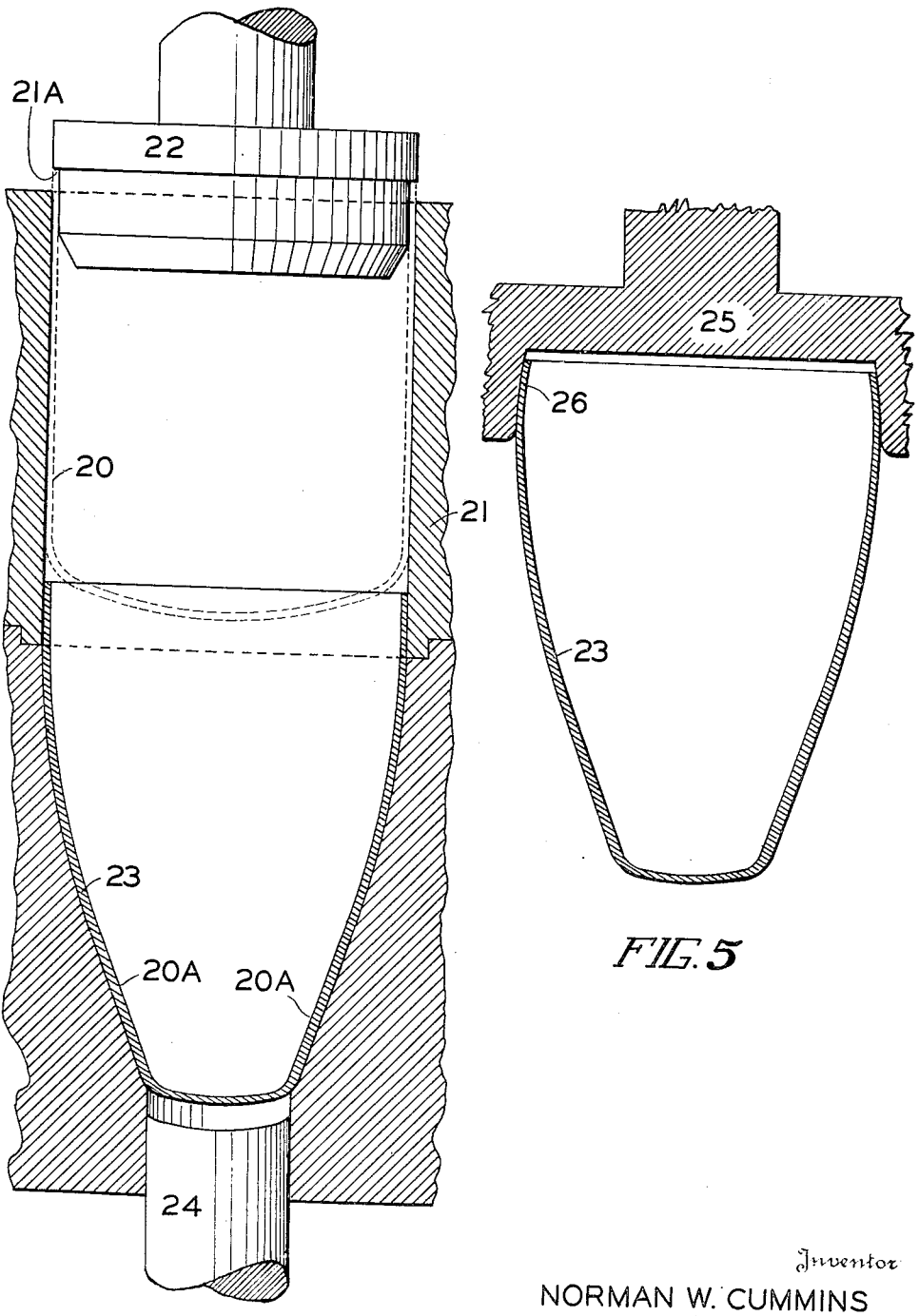
Fig. 5 is a cross section of a modified bowl to be similarly assembled to a base as shown in the previous figures, together with a forming tool explained hereinafter.
Fig. 6 is an elevation principally in cross section of tools as used in forming the bowl shown in Fig. 5 together with the blank before and the product after forming, both shown in cross section.

In Fig. 6 shell 20 is shown after the second operation from the blank, before removal from forming die 21 constructed with straight walls. Ram 22 is employed to engage top edge 21a of blank 20 and push it along the inside of the cavity as shown by numeral 23. During this pushing process the bottom tapering wall 20a is materially thickened due to crowding in of the metal while the top wall remains the same as at the beginning which is also substantially true of the bottom. By this procedure a bowl with a dense grain structure and smooth surface is produced. Coincident with this pushing operation the grain structure of the thickened wall has been materially condensed which facilitates surface finishing which not only contributes to a superior surface, but tangibly reduces the labor required. This is in contrast to bowls produced by the conventional methods of drawing or spinning or a combination of same, the former producing loose and torn fibres and the latter making objectionable tool marks. To satisfactorily finish the surfaces resulting from the latter methods involve expense eliminated by the incident method.

After ram 22 has been withdrawn, knock out pin 24 is moved vertically to eject the formed bowl. Bowl 23 is then placed into a die, not shown, corresponding to its outside contour of the bowl when ram, of the press in which the instrumentalities are disposed, forces forming die 25 over the mouth and results in reverse curve 26 substantially shown. The same procedure is followed in producing the reverse curve of Fig. 1 referred to supra.

The base can be formed with an integral nut in lieu of the separate nut as illustrated. Other modifications, combination and alterations can be indulged without departing from the spirit of this invention therefore I wish to be limited only by the appended claims.

I claim:

1. A method of producing a means for detachably securing a bowl to a base to produce a drinking cup, consisting of attaching the top surface of the head of a screw to the outside bottom surface of said bowl, by applying an electrode contacting and conforming to the inner surface of said bowl, applying a second electrode contacting the shoulder of said screw, passing an electric heating current across said shoulder to said bottom surface and applying pressure to effect an attaching weld.

2. A method of producing a means for detachably securing a bowl to a base to produce a drinking cup, consisting of welding the top concave surface of the head of a screw to the outside bottom surface of said bowl, said concave surface being formed on a sufficient radius to cause the welding to start at the remote edges of same, by applying an electrode contacting and conforming to the inner surface of said bowl, applying a second electrode contacting the shoulder of said screw, passing an electric heating current across said remote edges to said bottom surface and applying pressure to effect the desired weld.

3. A method of producing a means for detachably securing a bowl to a base to produce a drinking cup, consisting of welding the top concave surface of the head of a screw to the outside convex bottom surface of said bowl, said concave surface being formed on a lesser radius than that of the convex bottom, by applying an electrode contacting and conforming to the inner concave surface of said bowl applying a second electrode contacting shoulder of said screw, passing an electric heating current to said shoulder and said convex bottom surface and applying pressure to effect the desired weld.

4. The method for producing the bowl of a metal cup which consists of drawing a disc of sheet metal into the form of a cup, then pushing said cup into a compression die to reduce the diameter and thicken the walls adjacent the closed end of said cup.

5. The method for producing the bowl of a metal cup which consists of drawing a disc of sheet metal into the form of a cup, then pushing said cup into a compression die to reduce the diameter and thicken the walls adjacent the closed end of said cup; and subsequently reducing the diameter of the open end of said cup.

6. The method of making a metal bowl for a cup having a relatively thick wall adjacent the bottom, a relatively thin wall adjacent the open top, and wherein the amount of metal in the wall adjacent the top diminishes from a section adjacent the bottom toward the top, which comprises taking a flat blank of stock having a thickness substantially equal to the thickness of the wall adjacent the top in the resultant bowl and drawing it into a preliminary bowl, upsetting the stock while passing from said preliminary bowl to the resultant bowl to form the thickened wall adjacent the bottom leaving the top wall substantially unaltered as to thickness.

7. A method of producing a means for detachably securing a bowl to a base to produce a drinking cup, consisting of welding the top surface of the head of a screw to the outside bottom convex surface of said bowl, by applying an electrode contacting and conforming to the inner concave surface of said bowl, applying a second electrode contacting the shoulder of said screw, passing an electric heating current across said shoulder to said bottom surface and applying pressure to effect an attaching weld.

8. The method of making a metal drinking cup consisting of a bowl with a constricted opening and equipped with a means for detachably securing a supporting base, which comprises drawing a disc into a bowl, then constricting the diameter of the wall adjacent the opening to a lesser diameter by a compression die, then welding the top surface of a screw head to the outside bottom surface of said bowl by applying an electrode contacting and conforming to the inner surface of said bowl, applying a second electrode contacting the shoulder of said screw, passing an electric heating current across said shoulder to said bottom surface and applying pressure to effect an attaching weld.

9. The method of making a metal drinking cup consisting of a bowl equipped with a means for detachably securing a supporting base which comprises drawing a disc into a preliminary bowl, then constricting and upsetting the body by a compression die to thicken its wall adjacent the bottom, leaving the top wall substantially unaltered as to thickness, then welding the top surface of a screw head to the outside bottom surface of said bowl by applying an electrode contacting and conforming to the inner surface of said bowl, applying a second electrode contacting the shoulder of said screw, passing an electric heating current across said shoulder to said bottom surface and applying pressure to effect an attaching weld.

NORMAN W. CUMMINS.